United States Patent [19]

Hartnett

[11] Patent Number: 5,159,696
[45] Date of Patent: Oct. 27, 1992

[54] MASKABLE CASCADE COUNTER

[75] Inventor: Fred J. Hartnett, Dallas, Tex.

[73] Assignee: Microelectronics and Computer Technology Corporation, Austin, Tex.

[21] Appl. No.: 558,813

[22] Filed: Jul. 27, 1990

[51] Int. Cl.$^5$ .................................. H03K 21/02
[52] U.S. Cl. ........................... 377/55; 377/52; 377/33; 377/116; 364/DIG. 2
[58] Field of Search ............... 377/55, 52, 110, 116, 377/33; 364/947.4, DIG. 2

[56] References Cited

U.S. PATENT DOCUMENTS

| | | | |
|---|---|---|---|
| 3,391,305 | 7/1968 | Bradwin et al. | 377/52 |
| 3,548,203 | 12/1970 | Basse et al. | 377/110 |
| 3,629,715 | 12/1971 | Brown et al. | 377/110 |
| 3,962,565 | 6/1976 | Guyen-Phuoc | 377/52 |
| 4,344,036 | 8/1982 | Dakroub et al. | 377/52 |
| 4,477,920 | 10/1984 | Nygaard | 377/52 |
| 4,545,063 | 10/1985 | Kamimaru | 377/52 |
| 4,584,698 | 4/1986 | Sibigtroth et al. | 377/110 |
| 4,612,658 | 9/1986 | Eby | 377/52 |
| 4,669,042 | 5/1987 | Henderson et al. | 377/55 |
| 4,669,101 | 5/1987 | McCombs | 377/116 |
| 4,706,266 | 11/1987 | Qayyum | 377/33 |
| 4,891,827 | 1/1990 | Slater | 377/116 |

OTHER PUBLICATIONS

Altera Application Brief AB8, "Efficient Counter Design with Toggle Flip-Flops", Altera EPLD Handbook, 1985, pp. 205-207.

*Primary Examiner*—John S. Heyman
*Attorney, Agent, or Firm*—Ross, Howison, Clapp & Korn

[57] ABSTRACT

Two cascaded eight-bit maskable counters (62) and (64) provide a sixteen-bit output, for instance, to a digital-to-analog converter (10). Each of the counters (62) and (64) is a maskable counter that is operable to mask off a programmable number of the least significant bits therein. The next adjacent bit thereto comprises a virtual least significant bit. During the counting operation, the count is initiated at the virtual least significant bit such that the virtual least significant bit is clocked for each counting cycle. An initial value is first loaded into the counter (62) and (64) on a data bus (74). Thereafter, masked data is loaded into the counters (62) and (64) on the same data bus (74) to define the ones of the least significant bits that are masked off. In such a manner, the overall resolution of the counter can be varied without varying the clock rate to the counter. By masking off the bits, the count is automatically incremented by a value equal to that represented by the masked off bits for each cycle of the clock input to the counter.

37 Claims, 4 Drawing Sheets

MASKABLE CASCADE COUNTER

TECHNICAL FIELD OF THE INVENTION

The present invention pertains in general to counters and, more particularly, to a maskable counter that allows a programmable number of the least significant bits to be masked to provide a variable resolution counter.

BACKGROUND OF THE INVENTION

In present systems utilizing high resolution digital-to-analog converters (DAC), it is desirable in some applications to provide a ramp voltage having a variable slope and offset for a given ramp time. Such applications would be those concerned with varying a voltage that is input to a scan system with one or more axis, such as a scanning electron microscope, to move or deflect a beam.

In applications utilizing ramp generators to vary a voltage, prior systems have utilized a counter with the output thereof input to the DAC. This is utilized to provide a relatively high resolution output for control, versatility, etc. For a given ramp voltage range with a voltage that varies from a minimum to a maximum, this is a relatively straightforward process. However, when the maximum ramp voltage needs to be varied and/or the starting voltage needs to be adjusted, this becomes a more difficult problem.

One application that utilizes a varying ramp voltage is that for controlling the voltage required to move or deflect an electron beam along either the x-and/or y-axis of a scanning electron microscope (SEM). If, for example, a pattern to be scanned were defined that covered an area ten centimeters by ten centimeters, a situation may arise where only an area one centimeter by one centimeter need be scanned. Typically, the area over which the beam is scanned is defined in terms of a predetermined scan rate and a predetermined number of pixels per scan. For example, along one axis there may exist 512 pixels which would require the capture of video data 512 times during each scan of the X-axis. This would therefore require 512 pixels to be generated for a scan of the one centimeter length and 512 pixels to be generated for a scan of the ten centimeter length. This would require a voltage that would be stepped between a zero value and a first maximum corresponding to the one centimeter area, with the same voltage being stepped from a zero value to a second maximum corresponding to the ten centimeter area, that would be a factor of ten times the first maximum.

When scanning different sized areas, conventional counters present a problem in that the resolution of the counter is fixed, thus requiring a longer count to provide a higher output voltage from the DAC. Therefore, the resolution would be governed by the smallest voltage step for the smallest area to be scanned. Since each pixel for either the one centimeter area or the ten centimeter area needs to be scanned in the same amount of time, prior systems have merely increased the clock rate of the counter when scanning a ten centimeter area in order to sufficiently step the voltage for each pixel. However, this is impractical when considering a large difference in scanned areas. Furthermore, a divider circuit is needed to keep the pixel rate constant.

In view of the above disadvantages, there exists a need for a counter that operates at a given scan rate and allows a programmable number of the least significant bits to be masked off.

SUMMARY OF THE INVENTION

The present invention disclosed and claimed herein comprises a maskable counter. The counter includes a plurality of digital outputs that represent bits of a digital word, the bits ranging in value from a least significant bit to a most significant bit. Masking circuitry is provided for masking off programmable bits of the digital word to render them inoperative during the counting operation. Counting circuitry is provided and is associated with at least the unmasked bits of the digital word for counting from an initial value, in accordance with a predetermined counting sequence. The counting sequence counts the digital word as if the masked bits were removed from the sequence. Therefore, the unmasked bits become virtual bits. Furthermore, carry/borrow inputs and outputs provide the ability to cascade maskable and/or standard counters together.

In another embodiment of the present invention, the masking circuitry masks off a programmable number of adjacent least significant bits. The next higher order bit not included in the masked bits is termed a virtual least significant bit. The counting circuitry counts from the virtual least significant bit such that the virtual least significant bit is clocked for each counting cycle. In another embodiment of the present invention, the counting sequence is a binary counting sequence with each bit having a counter stage associated therewith. The counter stages are cascaded to form a binary counter. Clocking circuitry is provided for clocking the counter stages in the binary sequence from an initial count value in response to a count enable signal.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

The present invention is directed to a maskable counter. The embodiments set forth describe a binary counting sequence, however, the maskable counter can be implementated in other counting sequences such as BCD, gray code and the like. Likewise, the maskable counter is described in a digital-to-analog converter application for illustration purposes only. The maskable counter can be used in numerous other applications including stepper motor control and numerical operations.

Figure 1:
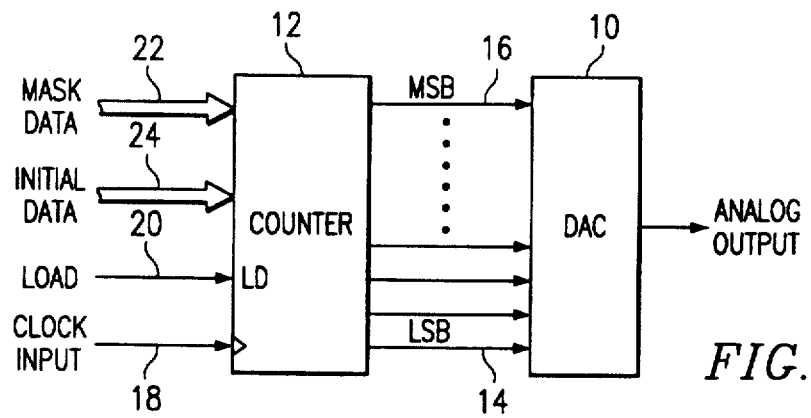
FIG. 1 illustrates a block diagram of a maskable counter and, for illustration purposes only, an associated DAC.

Referring now to FIG. 1, there is illustrated a block diagram of a digital-to-analog converter (DAC) 10 that has the digital input thereof controlled by a binary counter 12. Counter 12 is a maskable counter which allows a programmable number of least significant bits to be "masked off". The masking operation, as will be described in detail hereinbelow, is a step whereby the programmable number of least significant bits are skipped over during each count cycle.

The counter 12 outputs a fixed number of bits from an LSB on line 14 to an MSB on line 16. For a conventional binary count sequence utilizing the LSB on line 14, a binary word would be generated on the output of counter 12 with the LSB on line 14 clocked each clock cycle of counter 12. For the masked count operation, one of the bits is defined as a "virtual" least significant bit and all bits having a lower order than the virtual least significant bit are skipped over in the count sequence such that the count sequence is initiated at the virtual least significant bit, and this bit is clocked each clock cycle.

The counter 12 receives a clock input on a line 18 and a load input on a line 20. Mask data is provided on a bus 22 and initial data is provided on a bus 24. The mask data defines which of the least significant bits are to be masked off and the initial data determines the initial count value for the counter 12.

In operation, the initial data is first loaded into the counter 12 to define the initial digital value to be input to the DAC 10. This initial value defines the analog voltage on the output at which a ramp is to be started from. Thereafter, the mask data is input on bus 22 to determine which of the least significant bits are to be masked off. This in effect sets the step size of the analog voltage on the output of DAC 10. Therefore, by varying the mask data, the step size can be varied on the analog output for each clock cycle of the counter 12.

Figure 2:
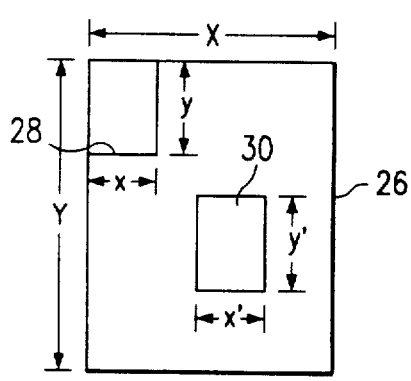
FIG. 2 illustrates one application of the structure of FIG. 1.

Referring now to FIG. 2, there is illustrated a pattern 26 that is represented by x- and y-coordinates, this pattern representing one application of the structure of FIG. 1, that application being a scanning electron microscope (SEM). In the first example, it is desirable to scan the entire pattern 26 along the x-coordinate, which will have a scan distance of "X". The y-coordinate will be scanned over a distance of "Y". In a second example, a pattern 28 will be scanned which will have a length along the x-coordinate of "x" and a length along the y-coordinate of "y". Pattern 28 is in the upper left hand corner of pattern 26, with the upper left hand corner representing the intersection of the x- and y-coordinates at a zero value. In a third example, the pattern 28 is moved to another location in the pattern 26, represented by pattern 30, having the same dimensions as the pattern 28. The y-coordinates are represented by a dimension "y'" and the x-coordinates are represented by a dimension "x'". In general, we will only discuss the scanning of the x-coordinate dimension.

In order to scan one axis, it is necessary to generate a voltage from an initial value, representing one side of the pattern, to a maximum value representing a value somewhere between the left and the right side of the pattern 26. The voltage on the grid of the electron beam deflection system will define where along the X-axis of the pattern 26 the beam will reside. Therefore, by varying this voltage from a minimum to a maximum value, the entire X-axis can be scanned or any portion thereof. A scan can be initiated anywhere along the X-axis and be terminated anywhere along the X-axis. Typically, a ramp voltage is generated to provide the actual scanning operation, the ramp varying from a minimum voltage to a maximum voltage at a predetermined rate, called the scan rate. Each scan of the electron beam from minimum to maximum defines a scan line, this scan line being divided into a number of pixels, which for this example will be 512. Therefore, it is necessary to scan the dimension "X" at the same rate that the dimension "x" is scanned. Further, it is necessary that the video be captured 512 times during a given scan line. A frame is completed when all scan lines which make up the Y-axis have been completed.

Figure 3A:
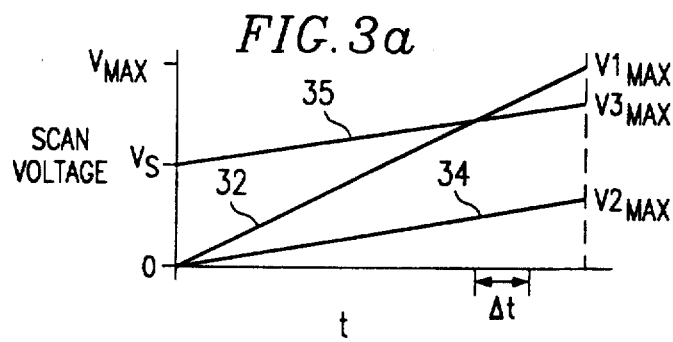
FIGS. 3a and 3b illustrate the ramps that are generated by the structure of FIG. 1 when utilizing the application of FIG. 2.
Figure 3B:
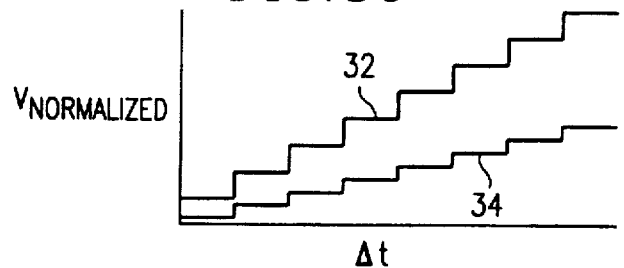

Referring now to FIGS. 3a and 3b, there are illustrated the various ramp voltages for the three patterns 26, 28 and 30 of FIG. 2. To scan the entire x-axis dimension "X" of the pattern 26, a ramp voltage represented by a curve 32 is generated which varies from a value of zero to a value of $V1_{max}$. The ramp voltage necessary to scan the x-axis of the pattern 28 along the x-dimension is represented by a curve 34. The curve 34 varies from a value of zero to a value of $V2_{max}$, this voltage being less than $V1_{max}$. The ramp voltage necessary to scan the x-axis of the pattern 30 along the dimension "x'" is represented by a curve 35, the curve 35 varying from a value of Vs to a value of $V3_{max}$, the value of Vs being greater than $V2_{max}$, and the value of $V3_{max}$ being somewhere between the $V1_{max}$ and $V2_{max}$.

Referring now to FIG. 3b, a section of curves 32 and 34 are illustrated over a range Δt. The voltage ramp output by DAC 10 is essentially a stair step voltage which varies in quantized steps. Each step of a given curve is equal, and is incremented (or decremented) for each change in the counter 12 output. Typically, the voltage is varied from one quantized value to the next for each of the 512 pixels that is sampled. It can be seen that the step size on the curve 34 is significantly smaller than the step size on the curve 32. However, the step size is varied without varying the clock rate of the counter 12, which is an important aspect of the present invention and will be described in more detail hereinbelow.

Figure 4:
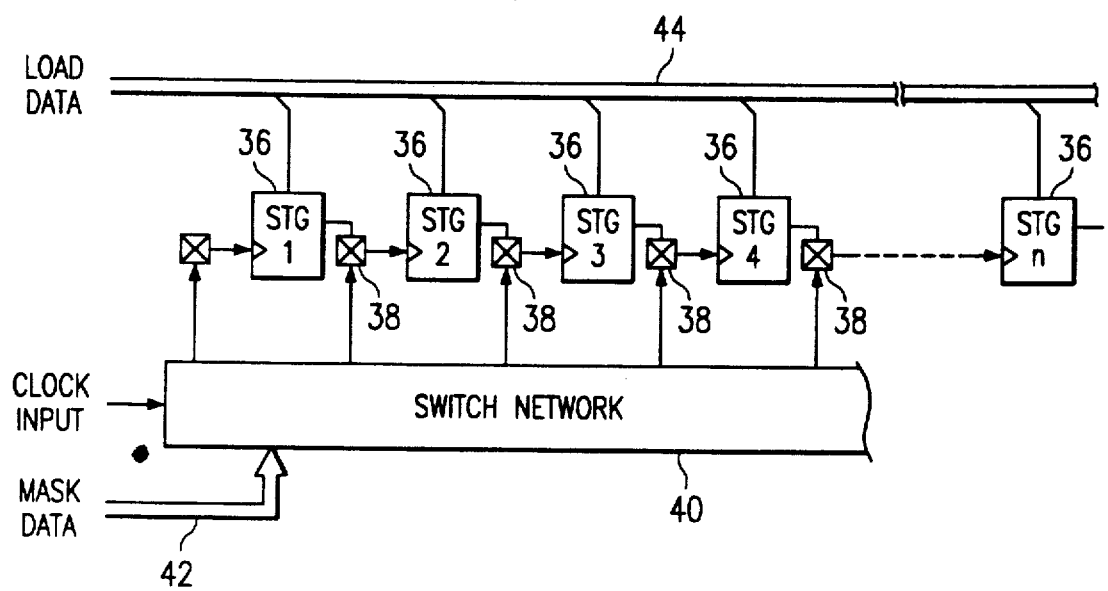
FIG. 4 illustrates a block diagram of a simplified embodiment of the masked counter.

Referring to FIG. 4, there is illustrated a simplified schematic illustrating the concept of masking the least significant bits of the counter 12 by way of a ripple counter which can be used with the masking scheme. In FIG. 4, the counter is represented by a plurality of counter stages 36 ranging in value from 1 to n. The data outputs or the output of each stage is connected to the input of a multiplexer 38, there being a multiplexer associated with the output of each of the stages 36, and the output of the multiplexer 38 is input to the clock input of the next successive stage 36. The other input to the multiplexer 38 is connected to the output of a switch network 40. The embodiment of FIG. 4 is for illustrative purposes only.

The switching network 40 receives the clock input and switches it to one of the multiplexers 38, such that the clock input can be input to either the first stage 36 or any one of the succeeding stages 36. For example, if the clock were switched to the input of the fourth stage 36, this would effectively remove the first three stages 36 from the counting operation. If the counter were originally a nine-bit counter, this would result in the counter operating like a six-bit counter. However, nine bits are still output by the counter with the first three bits remaining constant. The first three bits have been effectively masked and the fourth bit defined as the virtual LSB of the counter. The mask data defining which of the bits are to be masked is input on a bus 42 to the switch network 40. This determines which of the multiplexers is selected. Initial data is loaded from a bus 44 into each of the counter stages 36.

Figure 5:
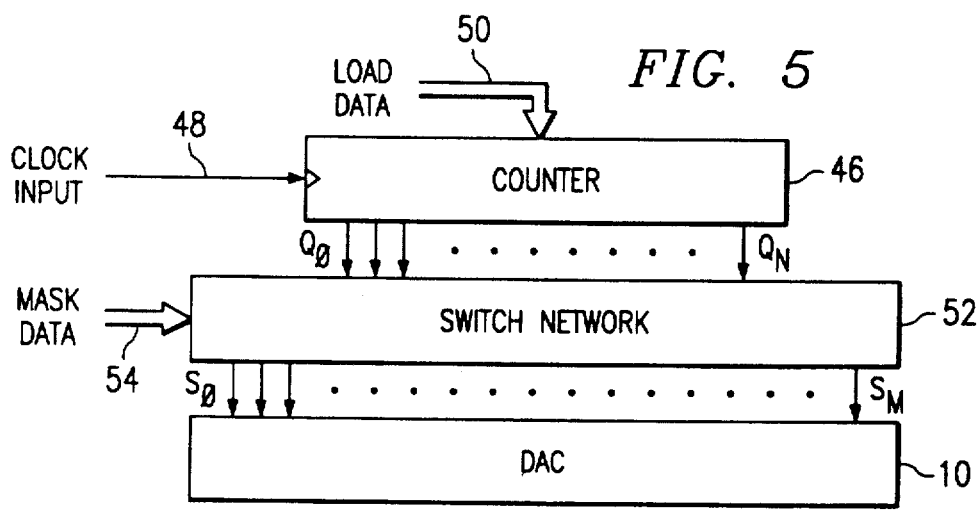
FIG. 5 illustrates a block diagram of an alternate method for controlling the DAC.

Referring now to FIG. 5, there is illustrated a block diagram of a circuit that further illustrates the masking concept when interfaced with the DAC 10. A counter 46 is provided which is not a maskable type and provides outputs $Q_0$ through $Q_n$. A clock input is received on a line 48 and initial data is loaded on a bus 50. The counter outputs $Q_0-Q_n$ are input to a switch network 52. The switch network 52 has a plurality of outputs $S_0-S_m$ with the value of m being greater than n. Therefore, there are more outputs from the switch network 52 than there are outputs from the counter 46.

Figure 5A:
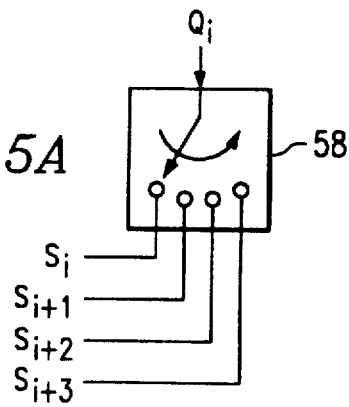
FIG. 5a illustrates the operation of one of the switches in the switch network of FIG. 5.

The output of switch network 52 is input to the digital input of the DAC 10. The switch network 52 receives the mask data on a bus 54, this data indicating how the switch network 52 is to be configured. If the three least significant bits output by the switch network are to be masked off, then the $Q_0$ output of counter 46 would be connected to the S3 output of switch network 52, the $Q_1$ output of counter 46 would be connected to the S4 output of switch network 52, etc. Of course, with this network, the masked bits input to the DAC 10 would not be defined by the counter 46 and therefore must be preset by some other means not shown herein. As seen in FIG. 5a, each of the outputs of counter 46 are associated with a switch 58 that has the input thereof operable to be connected to one of four sequential outputs of the switch network 52. The virtual LSB in this configuration would, of course, be the actual LSB of the counter 46.

Figure 6:
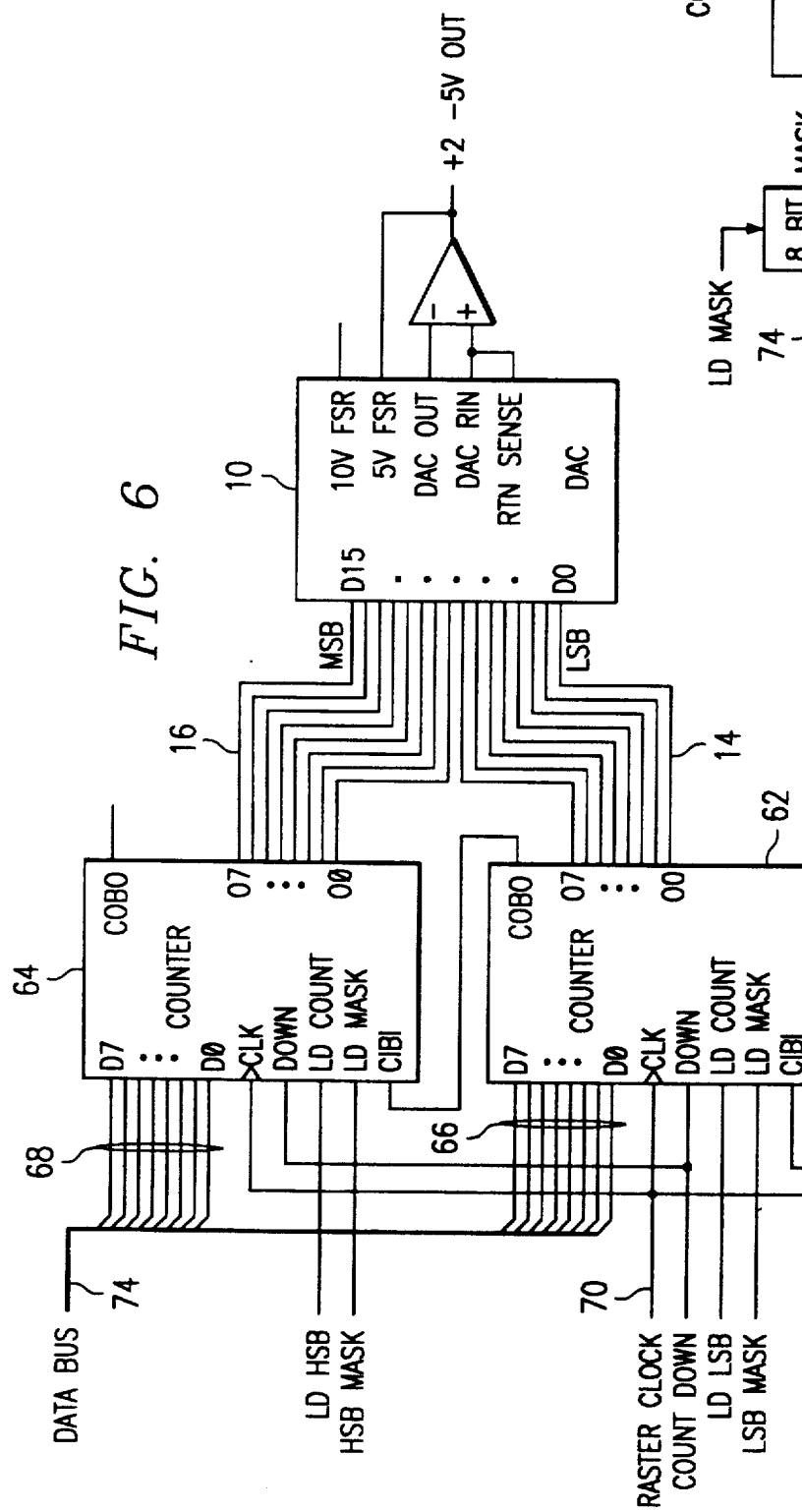
FIG. 6 illustrates a block diagram of the preferred embodiment of the present invention counter and, for illustration purposes only, an associated DAC and pixel control.

Referring now to FIG. 6, there is illustrated a block diagram of the preferred embodiment of the present invention for the counter 12. The counter 12 is comprised of first and second eight-bit counters 62 and 64 with latched data inputs. While eight-bit counters are shown it is understood that any size maskable counter can be used. Two maskable counters 62 and 64 are cascaded to provide a total of sixteen bits. Each of the counters 62 and 64 has associated therewith data input busses 66 and 68, respectively, each having eight data input lines, and a clock input provided for each of the counters 62 and 64. The clock inputs of the counters 62 and 64 are connected to a common raster clock on a line 70.

The counter 62 comprises the LSB counter and has two load inputs. The first load input is connected to a LD LSB signal to load the initial data in the counter 62. The second load input is utilized to load the mask data, this input connected to a signal LSB MASK which represents the mask data for the LSB counter 62. The counter 64 is the MSB counter which has two load inputs, a count load input and the mask load input, the count load input connected to the signal LD MSB and the mask load input connected to the signal MSB MASK. The carry output of the LSB counter 62 is labeled COBO and is connected to the carry input CIBI of the MSB counter 64. The outputs of the counters 62 and 64 are connected to the data inputs D0-D15 of the DAC 10.

An AND gate 72 is provided to define the pixel clock when utilized in a scanning operation. A pixel enable signal is input to one input of the AND gate 72 and the other input is the raster clock input on line 70. The output of the AND gate 72 comprises the pixel clock. The pixel enable signal also provides the carry input to the LSB counters 62.

In operation, both of the data inputs on lines 66 and 68 are connected to a common data bus 74 that provides eight bits of initial count data or mask data. When the counters are initialized, the timing is such that the initial count value for the LSB counter 62 is loaded followed by loading of the initial count value for the MSB counter 64. Thereafter, the mask value for the counter 62 is loaded and latched and then the mask value for the counter 64 is loaded and latched. The loading order set forth is for illustration only; the loading order is not critical. Returning to the example, after the counters 62 and 64 are initialized, the raster clock initiates the count which results in the generation of the ramp voltage on the output of the DAC 10. At the end of the scan line, the initial values need only be reloaded into counters 62 and 64. A similar circuit can be used in the y-axis and is reinitialized at the end of the entire raster scan.

Figure 7:
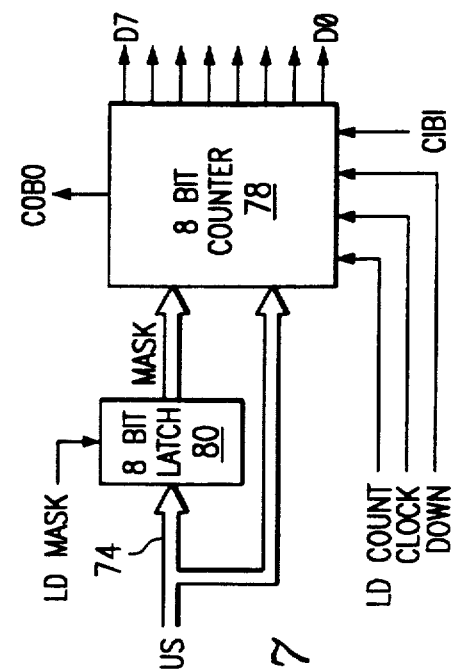
FIG. 7 illustrates a detailed block diagram of the counter and latch circuit from the preferred embodiment of FIG. 6.

Referring now to FIG. 7, there is illustrated an expanded block diagram of each of the counters 62 and 64. Each of the counters 62 and 64 is comprised of an eight-bit binary counter 78 with the data inputs thereof connected to data bus 74. The latch 80 also has its inputs connected to the data bus 74. Data is loaded directly into the counter from the data bus. Thereafter, data that is loaded into the latch 80 is latched therein to maintain the mask data. This will be described in more detail hereinbelow.

Figure 9A:
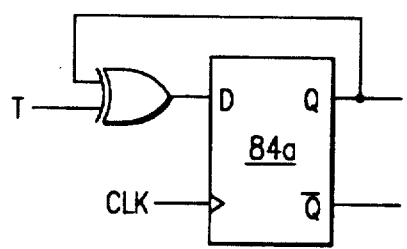
FIGS. 9a and 9b illustrate detailed schematic examples for the T-type flip flops of FIG. 8.
Figure 9B:
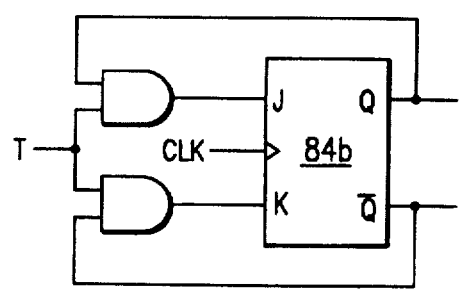
Figure 8:
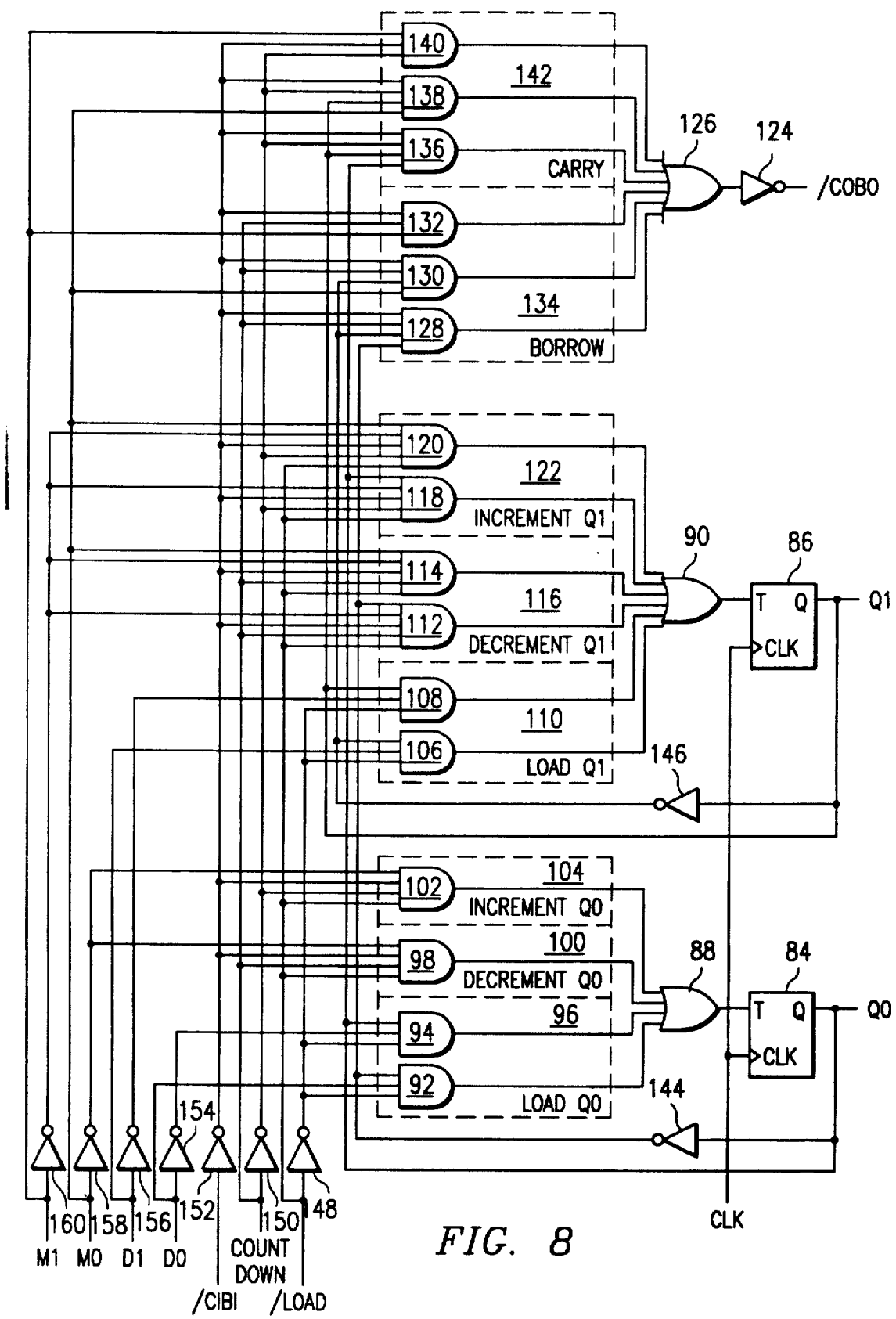
FIG. 8 illustrates a detailed schematic of two of the bit cells utilized in the masked counter of the structure of FIG. 6.

Referring now to FIG. 8, there is illustrated a detailed logic diagram for a maskable two-bit counter, it being understood that the two-bit counter is described only for simplicity purposes and the logic circuitry can be applied to a multi-bit counter. In the preferred embodiment, the counter 78 and latch 80 is realized with a conventional AND-OR configuration Programmable Array Logic circuit (PAL). Alternatively, counter 78 can be realized by other means such as a gate array or a chip built at mask level. The design herein is implemented with T-type flip-flops to minimize the number of required product terms. FIGS. 9a and 9b illustrate detailed logic diagrams of example implementations for T-type flip flops, shown as flip-flops 84a and 84b, respectively. However, it should be understood that any register type could be used if sufficient product terms are available to the register inputs.

For the two-bit counter FIG. 8, two T-type flip-flops 84 and 86 are provided. The input of flip-flop 84 is connected to the output of a four-input OR gate 88 and the T-input of flip-flop 86 is connected the output of a six-input OR gate 90. Clock inputs of each of the flip-flops 84 and 86 are connected to the common raster clock input. The Q output of flip-flops 84 and 86 represent the outputs $Q_0$ and $Q_1$, respectively. Two inputs of the OR gate 88 are connected to the outputs of AND gates 92 and 94, AND gates 92 and 94 being disposed within the box 96 representing the $Q_0$ bit load operation. One input of OR gate 88 is connected to the output of an AND gate 98, AND gate 98 being disposed within a box 100 representing the decrement operation for the $Q_0$ bit. The remaining input of the OR gate 88 is connected to the output of an AND gate 102, AND gate 102 disposed within a box 104 representing the increment operation for the $Q_0$ bit.

Two inputs of the OR gate 90 are connected to the outputs of AND gates 106 and 108, respectively, AND gates 106 and 108 disposed in a box 110 representing the load operation for the $Q_1$ bit. Two inputs of the OR gate 90 are connected to the outputs of AND gates 112 and 114, AND gates 112 and 114 disposed in a box 116 representing the decrement operation for the $Q_1$ bit. The remaining two inputs of the OR gate 90 are connected to the outputs of AND gates 118 and 120, AND gates 118 and 120 disposed in a box 122 representing the increment operation for the $Q_1$ bit.

The carry-out/borrow-out bit comprises the output of an inverter 124, the input of which is connected to the output of a six-input OR gate 126. COBO is an active low output. Three inputs of OR gate 126 are connected to AND gates 128, 130 and 132, respectively, AND gates 128, 130 and 132 disposed in a box 134 representing the borrow operation. The remaining three inputs to OR gate 126 are connected to the outputs of AND gates 136, 138 and 140, respectively, AND gates 136, 138 and 140 disposed in a box 142 representing the carry operation.

The $Q_0$ output of flip-flop 84 is connected to one input of AND gate 94, one input of AND gate 118 and one input of AND gate 136. The $Q_0$ output of flip-flop 84 is also connected through an inverter 144 to one input of AND gate 92, one input of AND gate 112 and one input of AND gate 128. In a similar manner, the $Q_1$ output of flip-flop 86 is connected to one input of AND gate 108, one input of AND gate 136 and one input of AND gate 138. The output of flip-flop 86 is also connected through an inverter 146 to one input of AND gate 106, one input of AND gate 128 and one input of AND gate 130.

The load input for the counter, which is an active low signal, is connected to one input of AND gate 98, one input of AND gate 102, one input of AND gate 112, one input of AND gate 114, one input of AND gate 118 and one input of AND gate 120. The load input is also connected through an inverter 148 to one input of AND gate 92, one input of AND gate 94, one input of AND gate 106 and one input of AND gate 108. The count down input is connected to one input of AND gate 98, one input of AND gate 112, one input of AND gate 114, one input of AND gate 128, one input of AND gate 130 and one input of AND gate 132. The count down signal is also input through an inverter 150 to one input of AND gate 102, one input of AND gate 118, one input of AND gate 120, one input of AND gate 136, one input of AND gate 138 and one input of AND gate 140. The carry-in/borrow-in signal is connected through an inverter 152 to one input each of AND gates 98, 102, 112, 114, 118, 120, 128, 130, 132, 136, 138 and 140. CIBI is an active low signal.

The counter also receives signals from inputs M0 and M1. The M0 input is connected to one input each of AND gates 114, 120, 130, and 138. The M0 input is also connected through an inverter 158 to one input each of AND gates 98 and 102. The M1 input is connected to one input each of AND gates 132 and 140. The M1 input is also connected through an inverter 160 to one input each of AND gates 112, 114, 118, and 120.

The counter also receives two data inputs D1 and D0. The D0 input is connected to one input of AND gate 92. The D0 input is also connected through an inverter 154 to one input of AND gate 94. The D1 input is connected to one input of AND gate 106. The D1 input is also connected through an inverter 156 to one input of AND gate 108.

With the utilization of T-type flip-flops, the following equations are needed for bit 0 of a standard synchronous counter:

$$T0 = \text{!LOAD \& !DOWN \& CIBI} \quad (1)$$
$$+ \text{!LOAD \& DOWN \& CIBI}$$
$$+ \text{LOAD \& !I0 \& Q0} \quad \text{(! denotes the}$$
$$+ \text{LOAD \& I0 \& !Q0} \quad \text{"not" function)}$$

where T0 is the input to the T flip-flop, LOAD is the synchronous load signal, DOWN is the down/up control bit, CIBI is the carry/borrow input, I0 is the data bit input, and Q0 is the current output of the flip-flop. The first two product terms are active when counting and not loading the counter. The CIBI input is used to enable the counting sequence, either up or down, and provides the capability to cascade devices. Bit 0 therefore toggles every clock cycle when the CIBI bit is enabled and the LOAD operation is not active.

The last two product terms are used only during the synchronous load operation. If the present output, Q0, is high and the input, I0, is low then product term three will toggle the flip-flop during the next clock cycle. Conversely, if the present output, Q0, is low and the input, I0, is high the fourth product term will toggle the flip-flop during the next clock operation. If the output and input are of the same sense, no action is taken during the next clock cycle. If asynchronous loading is required, the proper PAL configuration must be chosen which includes set and reset operations on the T flip-flop using similar load equations for these inputs.

For bit 1 of the standard counter ...

$$T1 = \text{!LOAD \& !DOWN \& CIBI \& Q0} \quad (2)$$
$$+ \text{!LOAD \& DOWN \& CIBI \& !Q0}$$
$$+ \text{LOAD \& !I1 \& Q1}$$
$$+ \text{LOAD \& I1 \& !Q1}$$

Here the output of the previous bit is ANDed with the enable signal, CIBI, to provide the carry or borrow signal to this stage. Bit 1 increments when the CIBI is enabled, the LOAD operation is not active, the DOWN bit is not active, and the $Q_0$ is presently a logic 1 (incrementing from 1 to 2, and from 3 to 0 in a two-bit example). Product term two provides the proper operation when the counter is decrementing. Similar load equations, used in bit 0, are also given for bit 1. This process can be carried out for the remaining counter bits.

A carry/borrow output signal must also be provided if the counters are to be cascaded. The COBO output equation for an eight-bit counter is:

$$COBO = \text{!DOWN \& CIBI \& Q7 \& Q6 \& Q5 \& Q4 \& Q3 \&} \quad (3)$$
$$Q2 \& Q1 \& Q0 + \text{DOWN \& CIBI \& !Q7 \& !Q6 \& !Q5 \& !Q4 \&}$$

-continued

!Q3 & !Q2 & !Q1 & !Q0

This signal is fed to the CIBI input of the next higher counter stage.

The maskable counter uses the same technique as the basic counter, except now there are two inputs for each counter bit. During the load operation, the inputs function just like the basic counter as described earlier. During the count operation, individual counter bits can be disabled by setting the appropriate mask input bit. Below is the new equation for bit 0:

$$T0 = \text{!LOAD \& !DOWN \& CIBI \& !M0} \quad (4)$$
$$+ \text{!LOAD \& DOWN \& CIBI \& !M0}$$
$$+ \text{LOAD \& !I0 \& Q0}$$
$$+ \text{LOAD \& I0 \& !Q0}$$

As it can be seen, the LOAD operation is the same as above. However, the count operation is masked by the current input signal, M0. When M0 is high, T0 is disabled and Q0 will not change with subsequent clock transitions. The real benefit becomes clear for higher order bits such as T1:

$$T1 = \text{!LOAD \& !DOWN \& CIBI \& !M1 \& (Q0 + M0)} \quad (5)$$
$$+ \text{!LOAD \& DOWN \& CIBI \& !M1 \& (!Q0 + M0)}$$
$$+ \text{LOAD \& !I1 \& Q1}$$
$$+ \text{LOAD \& I1 \& !Q1}$$

Now output Q1 changes on every clock cycle when bit Q0 is masked off (M0 is high) and M1 is low. In effect, the LSB of the counter has been shifted from Q0 to Q1; that is, Q1 is the virtual LSB of the counter. If bit Q2 is to be the new LSB for the next clock transition, then M1 and M0 must both be set prior to the next clock edge. For every clock transition, this maskable counter can increment by $2^n$ where n is 0, 1, 3, 7, etc.

The equations become more complex for higher order bits as shown below for bit Q4:

$$T4 = \text{!LOAD \& !DOWN \& CIBI \& !M4 \&} \quad (Q3 \& Q2 \& Q1 \& Q0 \quad (6)$$
$$+ Q3 \& Q2 \& Q1 \& M0$$
$$+ Q3 \& Q2 \& M1$$
$$+ Q3 \& M2$$
$$+ M3)$$
$$+ \text{!LOAD \& DOWN \& CIBI \& !M4 \&} \quad (!Q3 \& !Q2 \& !Q1 \& !Q0$$
$$+ !Q3 \& !Q2 \& !Q1 \& M0$$
$$+ !Q3 \& !Q2 \& M1$$
$$+ !Q3 \& M2$$
$$+ M3)$$
$$+ \text{LOAD \& !I4 \& Q4}$$
$$+ \text{LOAD \& I4 \& !Q4}$$

For an eight bit maskable up/down counter, with some simplification, the minimum number of product terms required for bit Q7 is seventeen.

Similarly, the COBO output equations for an eight bit maskable counter (without simplification) is:

$$\text{COBO} = \text{!DOWN \& CIBI \&} \quad (Q7 \& Q6 \& Q5 \& Q4 \& Q3 \& Q2 \& Q1 \& Q0 \quad (7)$$

-continued

+ Q7 & Q6 & Q5 & Q4 & Q3 & Q2 & Q1 & M0
+ Q7 & Q6 & Q5 & Q4 & Q3 & Q2 & M1
+ Q7 & Q6 & Q5 & Q4 & Q3 & M2
+ Q7 & Q6 & Q5 & Q4 & M3
+ Q7 & Q6 & Q5 & M4
+ Q7 & Q6 & M5
+ Q7 & M6
+ M7)
+ DOWN & CIBI & (!Q7 & !Q6 & !Q5 & !Q4 & !Q3 & !Q2 & !Q1 & !Q0
+ !Q7 & !Q6 & !Q5 & !Q4 & !Q3 & !Q2 & !Q1 & M0
+ !Q7 & !Q6 & !Q5 & !Q4 & !Q4 & !Q2 & M1
+ !Q7 & !Q6 & !Q5 & !Q4 & !Q3 & M2
+ !Q7 & !Q6 & !Q5 & !Q4 & M3
+ !Q7 & !Q6 & !Q5 & M4
+ !Q7 & !Q6 & M5
+ !Q7 & M6
+ M7)

Again, this signal can be fed to the CIBI input of the next higher counter stage. By selecting the proper signal sense of the COBO, LOAD, and DOWN signals this device can be made to be 100% compatible with conventional cascadable counters. For instance, a twelve-bit DAC could be used in the 512×512 pixel example above with four possible ramp sizes by using one maskable counter and one four-bit standard counter.

In the examples set forth, each bit less significant than the virtual LSB of the counter is to be masked as well. However, additional product terms could be written which would allow any bit or bits to be masked.

In summary, there is provided a maskable counter that operates in a counting sequence. The counter includes a plurality of maskable stages with each stage operable to be masked off. The masking operation is achieved by inputting a mask code into the counter, which mask code indicates which of the bits are to be masked for the counting operation.

Although the preferred embodiment has been described in detail, it should be understood that various changes, substitutions and alterations can be made therein without departing from the spirit and scope of the invention as defined by the appended claims.

What is claimed is:

1. A maskable counter for performing a counting operation on a digital word, comprising:
   a plurality of digital outputs representing bits of the digital word and ranging from a non-virtual least significant bit to a non-virtual most significant bit;
   masking circuitry for internally masking off a predetermined number of the non-virtual least significant bits of said digital word from the counting operation to define the next higher order one of the unmasked bits as a virtual least significant bit;
   counting circuitry for operating over a plurality of count cycles and associated with at least the unmasked bits of said digital word for counting from an initial value of said digital word during a given count cycle, for at least said unmasked bits, in accordance with a predetermined counting sequence, with said virtual least significant bit constituting the least significant bit in said predetermined counting sequence; and
   said digital outputs including those associated with said masked bits such that said non-virtual least significant bit is always output.

2. The counter of claim 1 wherein said counting circuitry is associated with each of said bits of said digital word and wherein the portion of said counting circuitry associated with said masked bits is inhibited from operating during counting in said predetermined counting sequence.

3. The counter of claim 1 wherein said counting sequence is a binary counting sequence.

4. The counter of claim 1 and further comprising loading circuitry for loading said initial value for at least said unmasked digital bits in said digital word prior to activating said counting circuitry.

5. The counter of claim 4 wherein said initial value defines the value of all of the bits of said digital word.

6. The counter of claim 1 wherein said counting circuitry operates in count cycles with the value of said digital word incremented by a value of one for each of said count cycles and further comprising a count clock for incrementing said count cycles.

7. The counter of claim 6 wherein said masking circuitry comprises means for controlling said counting circuitry to increment the count value by the value represented by the masked off ones of the bits of said digital word for each count cycle.

8. The counter of claim 1 wherein said counting circuitry operates in count cycles with the value of said digital word decremented by a value of one for each of said count cycles and further comprising a count clock for decrementing said count cycles.

9. A maskable counter for performing a counting operation on a digital word, comprising:
  a plurality of digital outputs representing bits of the digital word and arranged from a least significant bit to a most significant bit;
  a counter stage associated with each of the bits of said digital word and having an output associated with each of the bits, the outputs of said counter stages providing said digital outputs;
  said counter stages cascaded to form a binary counter that counts in a binary sequence;
  clocking circuitry for clocking said counter stages in said binary sequence from an initial count value and in response to a count initiation signal;
  masking circuitry for masking off a predetermined number of adjacent ones of said bits from the counting operation including said least significant bit to define the next higher one of said bits not masked off by said masking circuitry as a virtual least significant bit; and
  counter control circuitry for controlling the counting operation of said counter stages to count from said virtual least significant bit, thereby bypassing the count operation off the ones of said counter stages associated with said masked bits.

10. The counter of claim 1 and further comprising masked data loading circuitry for loading mask data into a register prior to initiating said counting sequence, the mask data interfaced with said masking circuitry to define the ones of said bits masked off by said masking circuitry.

11. A maskable counter for performing a counting operation on a digital word, comprising:
  a plurality of digital outputs representing bits of the digital word and arranged from a non-virtual least significant bit to a non-virtual most significant bit;
  a counter stage associated with each of the bits of said digital word and having an output associated with each of the bits, the outputs of said counter stages providing said digital outputs;
  said counter stages cascaded to form a counter that counts in a predetermined count sequence for a plurality of count cycles;
  clocking circuitry for clocking said counter stages in said sequence from an initial count value of said digital word during a given count cycle and in response to a count initiation signal;
  masking circuitry for internally masking off a predetermined number of adjacent ones of said bits from the counting operation including said non-virtual least significant bit to define the next higher one of said bits not masked off by said masking circuitry as a virtual least significant bit;
  counter control circuitry for controlling the counting operation of the ones of said counter stages associated with said unmasked bits to count from said virtual least significant bit, thereby bypassing the count operation of the ones of said counter stages associated with said masked bits; and
  each of said counter stages providing a digital output such that said non-virtual least significant bit is always output.

12. The counter of claim 11 wherein each of said counter stages can be preset to a predetermined logic state and further comprising loading circuitry for loading said initial count value into said counter stages prior to initiation of said counting sequence.

13. The counter of claim 11 wherein said masking circuitry comprises means for incrementing or decrementing the counting sequence by a value equal to that represented by said masked bits for each cycle of said clock.

14. A voltage generator, comprising:
  a plurality of digital outputs representing bits of a digital word and ranging from a least significant bit to a most significant bit;
  a digital-to-analog convertor for converting said digital word to an analog voltage level;
  masking circuitry for selectively masking off a predetermined number of the least significant bits of said digital word to define the next higher order least significant bit from said masked off bits as a virtual least significant bit for a counting operation; and
  counting circuitry associated with at least the unmasked bits of said digital word for performing the counting operation and counting from an initial value for at least said unmasked bits in accordance with a predetermined counting sequence with said virtual least significant bit constituting the least significant bit in said predetermined counting sequence.

15. The counter of claim 11 wherein said counting operation can increment or decrement in response to an external direction control signal.

16. The counter of claim 11 wherein said counter is a binary counter and said counting sequence is a binary counting sequence.

17. A voltage generator, comprising:
  a plurality of digital outputs representing bits of a digital word and ranging from a non-virtual least significant bit to a non-virtual most significant bit;
  a digital-to-analog converter for converting said digital word to an analog voltage level;
  masking circuitry for internally and selectively masking off a predetermined number of the non-virtual least significant bits of said digital word to define the next higher order least significant bit from said masked off bits as a virtual least significant bit for a counting operation;
  counting circuitry for operating over a plurality of count cycles and associated with at least the unmasked bits of said digital word for performing a counting operation and counting from an initial value of said digital word during a given count cycle for at least said unmasked bits in accordance with the predetermined counting sequence, with said virtual least significant bit constituting the least significant bit in said predetermined counting sequence; and said digital outputs including those associated with said masked bits such that said non-virtual least significant bit is always output.

18. The voltage generator of claim 17 wherein said counting circuitry is associated with each of said bits of said digital word and wherein the portion of said counting circuitry associated with said masked bits is inhibited from operating during counting in said predetermined counting sequence.

19. The voltage generator of claim 17 wherein said counting sequence is a binary counting sequence.

20. The voltage generator of claim 17 and further comprising loading circuitry for loading said initial value for at least said unmasked digital bits in said digital word prior to activating said counting circuitry.

21. The voltage generator of claim 20 wherein said initial value defines the value of all of the bits of said digital word.

22. The voltage generator of claim 17 wherein said counting circuitry operates in count cycles with the value of said digital word incremented by a value of one for each of said count cycles and further comprising a count clock for incrementing said count cycles.

23. The voltage generator of claim 22 wherein said masking circuitry comprises means for controlling said counting circuitry to increment the count value by a value represented by the masked off ones of said bits of said digital word for each count cycle.

24. The voltage generator of claim 17 wherein said counting circuitry operates in count cycles with the value of said digital word decremented by a value of one for each of said count cycles and further comprising a count clock for decrementing said count cycles.

25. The voltage generator of claim 24 wherein said masking circuitry comprises means for controlling said counting circuitry to decrement the count value by a value represented by the masked off ones of said bits of said digital word for each count cycle.

26. The voltage generator of claim 17 and further comprising masked data loading circuitry for loading mask data into a register prior to initiating said counting sequence, the mask data interfaced with said masking circuitry to define the ones of said bits masked off by said masking circuitry.

27. A method for masking a counting sequence operating on a digital word, comprising the steps of:
providing a plurality of digital outputs representing the digital bits of the digital word, the bits ranging from a non-virtual least significant bit to a non-virtual most significant bit;
defining one of the bits of the digital word as a virtual least significant bit for the counting sequence, the virtual least significant bit being between the non-virtual least significant bit and the non-virtual most significant bit of the digital word;
changing the value of the digital word over a given one of a plurality of count cycles by changing the bits from the virtual least significant bit to the most significant bit in accordance with the sequence such that the virtual least significant bit is changed for each change in the counting sequence after initiation of the count cycle and during the count cycle; and
the digital output always containing the non-virtual last significant bit.

28. The method of claim 27 wherein the counting sequence is a binary counting sequence.

29. The method of claim 27 wherein the step of defining the virtual least significant bit comprises inputting said storing masked data to define a predetermined number of bits as masked bits, the masked bits including the least significant bit, the bit next adjacent the highest order bit in the masked bits defined as the virtual least significant bit.

30. The method of claim 27 wherein the step of changing the value of the bits comprises incrementing the value represented by the bits or decrementing the value represented by the bits in response to an external direction control signal.

31. A maskable counter for performing a counting operation on a digital word, comprising:
a plurality of digital outputs representing bits of the digital word and ranging from a non-virtual least significant bit to a non-virtual most significant bit;
counting circuitry operating over a plurality of count cycles for changing the value of said digital output from an initial value to a final value during a given count cycle in predetermined and equal increments in accordance with a predetermined counting sequence;
masking means for masking off a predetermined portion of said counting sequence in said counting circuitry between a first value and a second value in said counting sequence during the given count cycle, said predetermined portion representing a value in said counting sequence greater than one of said predetermined equal increments, such that said counting circuitry changes the value of said digital output in accordance with said counting sequence from said first value to said second value without outputting any value therebetween; and
all of said digital outputs associated with the digital word existing, even for said masked bits.

32. The counter of claim 31 wherein said predetermined counting sequence is a binary counting sequence.

33. The counter of claim 31 wherein said counting circuitry comprises:
a counter stage associated with each of said digital outputs, said counter stage operable to be cascaded to count a binary sequence; and
clock circuitry for incrementing said counter stages in predetermined clock cycles in response to receiving an external clock.

34. The counter of claim 33 and further comprising means for inputting said initial value into said counter stages.

35. A method for masking bits in a counter for performing a counting sequence on a digital word, comprising:
providing a plurality of digital outputs representing bits of the digital word and ranging from a non-virtual least significant bit to a non-virtual most significant bit;
changing the value of the digital outputs from an initial value to a final value during a given one of a plurality of count cycles in predetermined and equal increments in accordance with the counting sequence;

masking off a predetermined portion of the counting sequence between a first value and a second value in the counting sequence during the given count cycle, the predetermined portion representing a value in the counting sequence greater than one of the predetermined equal increments, such that the digital output changes in value in accordance with the counting sequence from the first value to the second value without outputting any value therebetween; and all of the digital outputs associated with the digital word existing, even for said masked bits.

36. The method of claim 35 wherein the counting sequence is a binary counting sequence.

37. The method of claim 35 and further comprising determining the initial value from which the counting sequence counts.

* * * * *